Patented Aug. 8, 1933

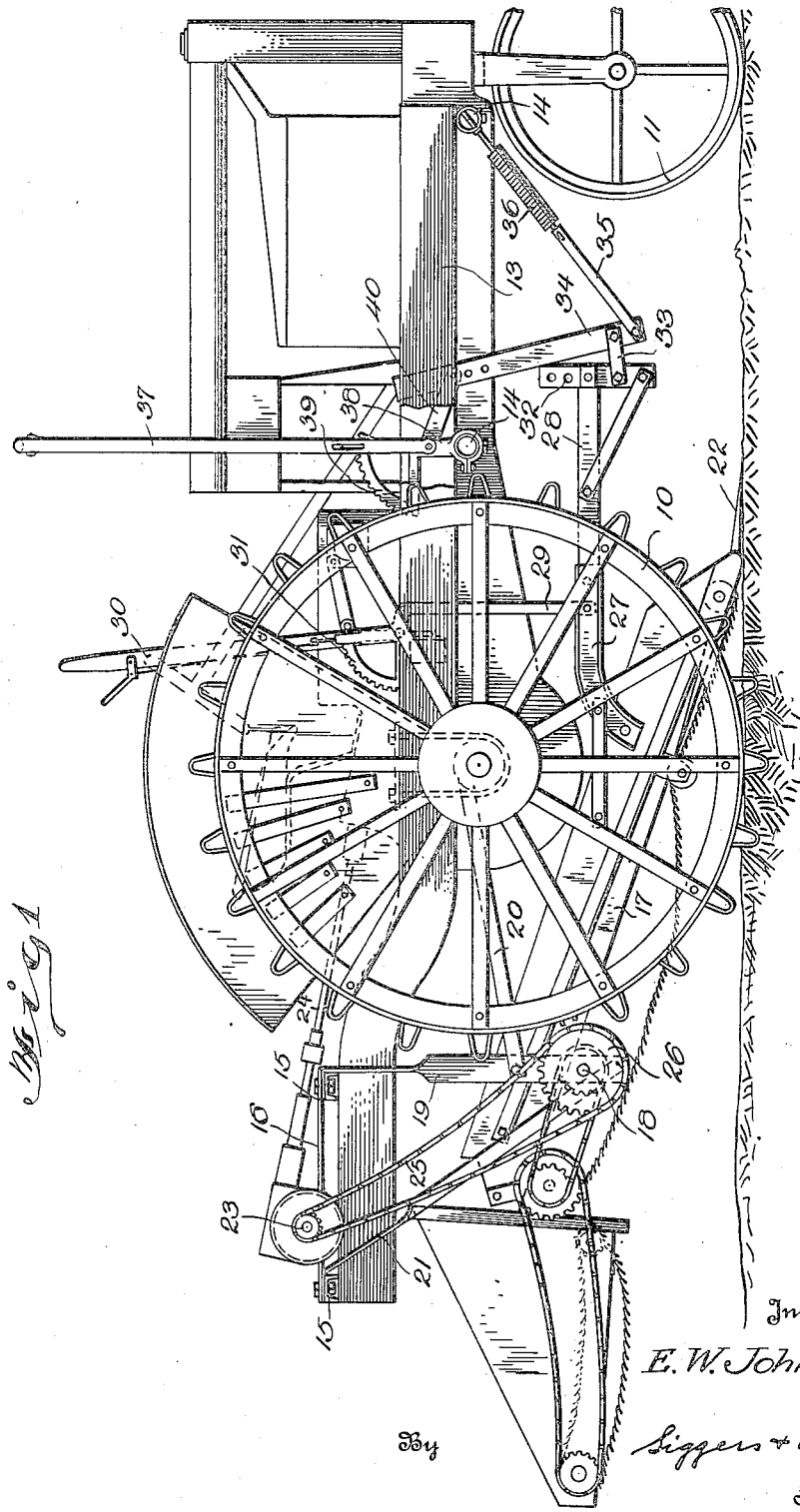

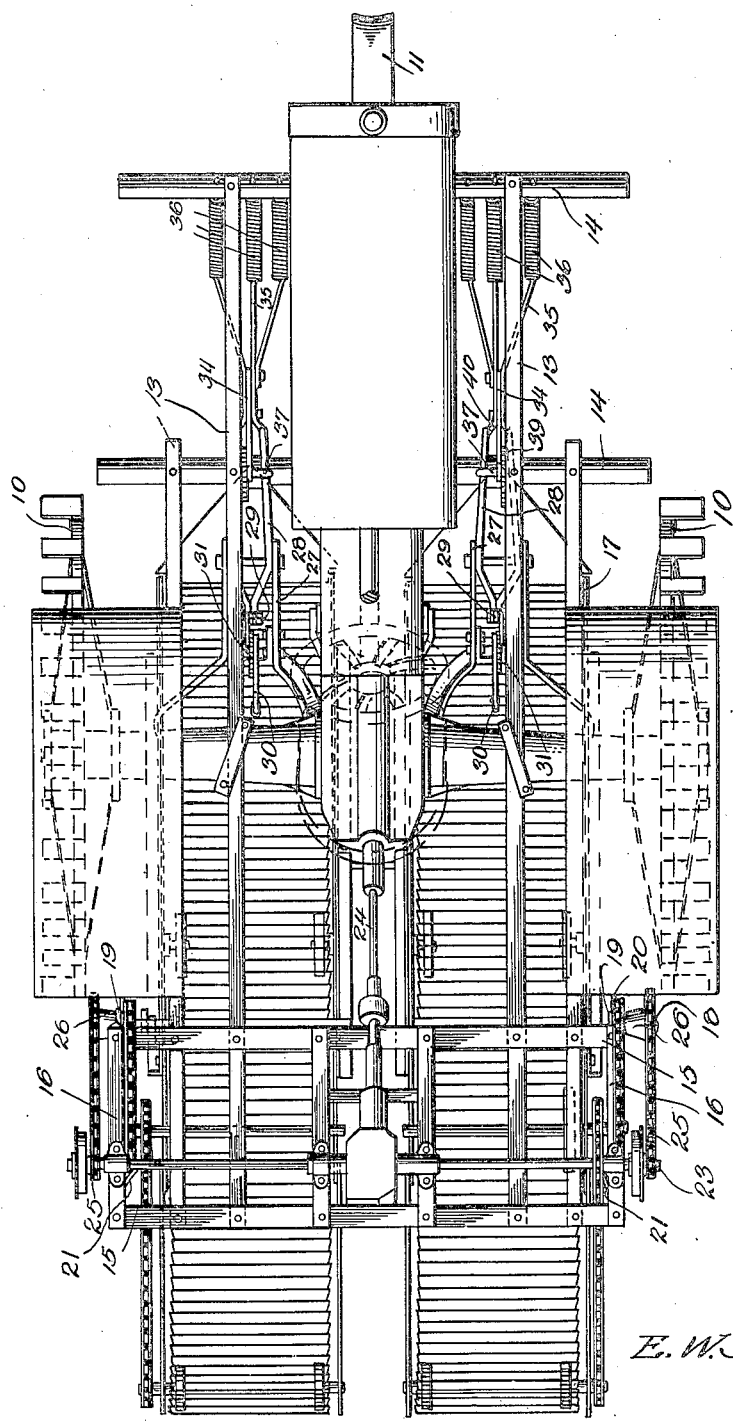

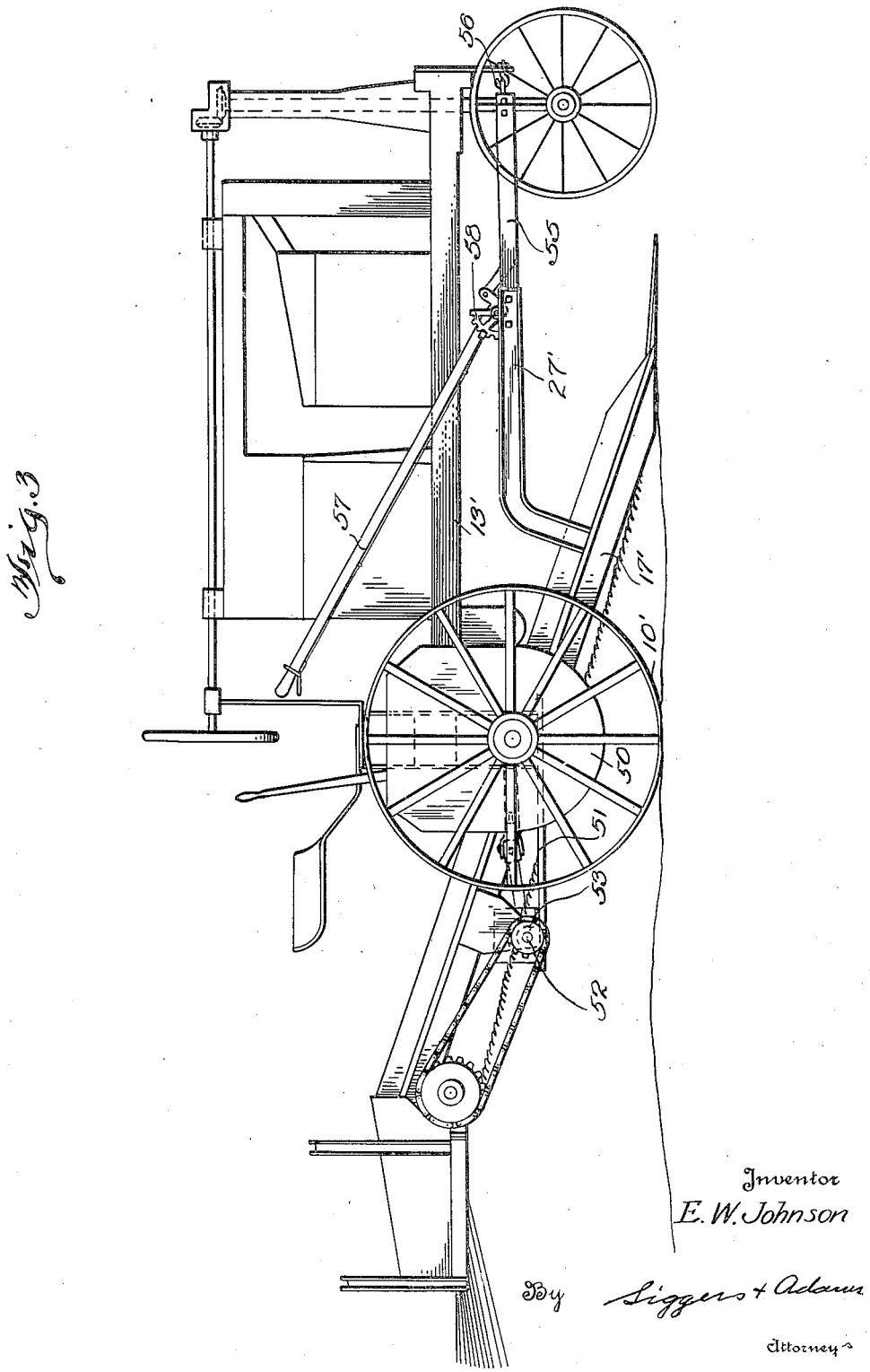

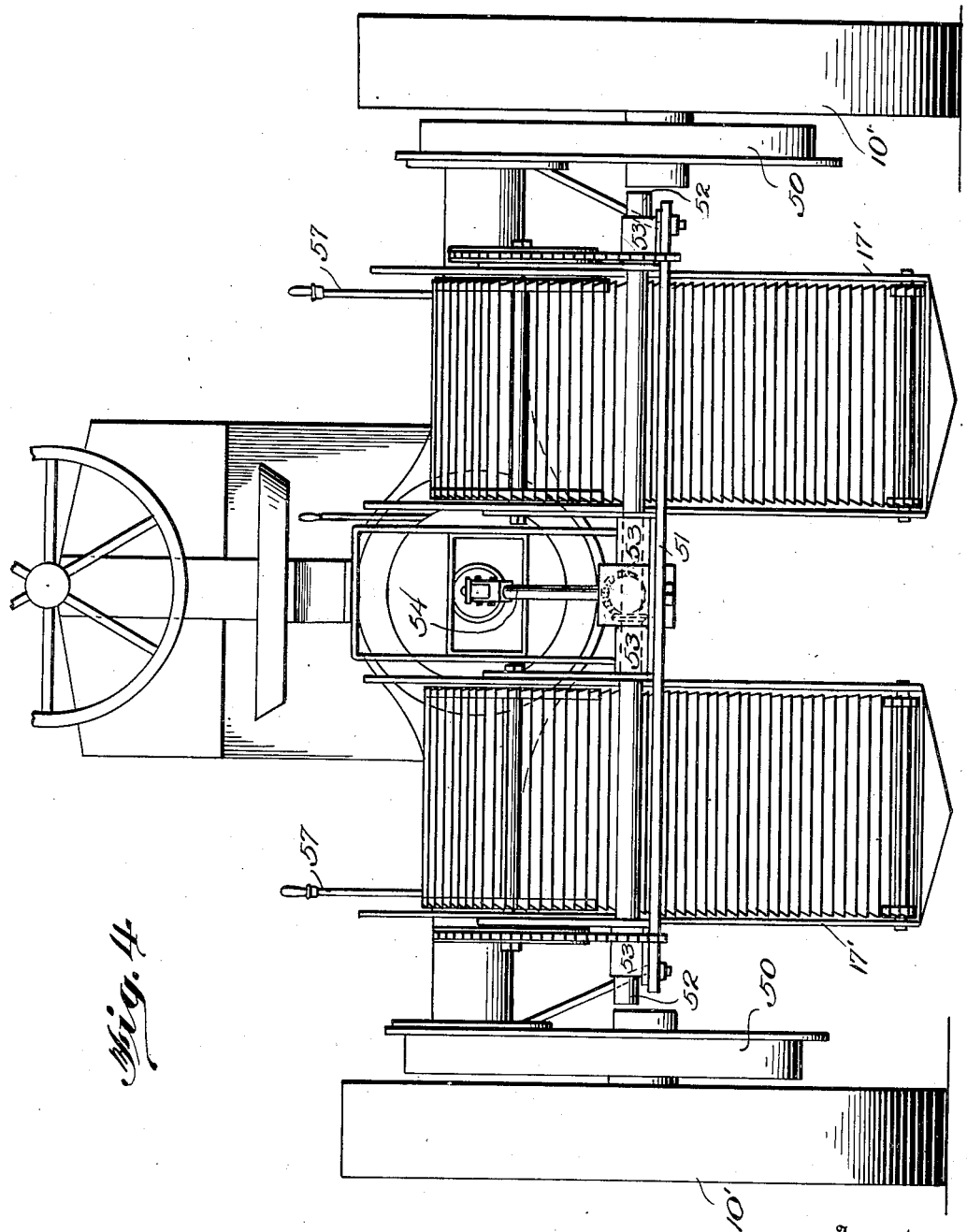

1,921,190

UNITED STATES PATENT OFFICE 1,921,190

UNDERSLUNG POTATO DIGGER FOR TRACTORS

Elmo W. Johnson, Hicksville, N. Y.

Application June 11, 1931. Serial No. 543,681

8 Claims. (Cl. 55—51)

This invention relates to potato harvesters and, among other objects, aims to provide improved digging mechanism suspended from a frame adapted to be mounted on a farm tractor and having control means arranged within easy reach of the driver's seat. The main idea is to provide a simple digger attachment consisting of one or more units which can be removably secured to and suspended under the tractor so that the overall length of the machine is greatly reduced, whereby it may be turned around on relatively narrow head lands.

Other aims and advantages of the invention will appear in the specification when considered in connection with the accompanying drawings, wherein:—

Fig. 1 is a side elevation of a tractor having the preferred form of digger attachment applied thereto;

Fig. 2 is a top plan view showing two digger units suspended from the tractor;

Fig. 3 is a side elevation, partly in outline, of a modified form of digger unit and mounting; and Fig. 4 is a rear end elevation of the machine shown in Fig. 3.

Referring particularly to Figs. 1 and 2, the digger attachment there shown is mounted on a well known type of tractor having traction wheels 10 adapted to straddle two rows and a single, swivelly mounted front wheel 11. In this instance, the digger and conveyor mechanisms are supported from a removable framework comprising longitudinal channel beams 13, front cross beams 14, rear cross beams 15 and longitudinal braces 16. The members 14 are shown as consisting of a pair of pipes projecting through the front part of the tractor chassis to which the ends of the beams 13 are removably secured. At an intermediate point the inner channel beams 13 are shown as shackled to the rear axle housing of the tractor. The rear ends of the beams 13 are bent upwardly and project behind the tractor, forming with the members 15 and 16 a superstructure permitting the conveyor mechanism to be suspended below it at a suitable distance above the ground.

A pair of digger units 17 of the general type shown in my Patent 1,721,122 are here shown as being pivotally mounted on transverse axles or shafts 18 journalled in suspending brackets 19 connected to the superstructure and having angle braces 20, Fig. 1. The units have plow shares 22 which project forwardly under the tractor and the arrangement is such that both units may be adjusted for the proper penetration by swinging them on their axles under the tractor axle. The conveyors of both units are adapted to be driven by a transverse jack-shaft 23 on the superstructure which is connected to a power take-off shaft 24 extending from the tractor differential (Fig. 2). Power is delivered to the conveyor mechanism from the jack-shaft by sprocket chains 25 and double sprockets 26 at the opposite sides of the units.

The forward end of each of the units has a pair of beams or draft bars 27 rigidly secured to its side plates (Fig. 1). A yoke 28, similar to that shown in my aforesaid patent, is pivotally connected intermediate its ends to the forward end of each pair of draft bars (Fig. 2) and, to the rear end of each yoke is pivotally connected a suspending link 29 adapted to be raised and lowered or adjusted by a hand lever 30 having a locking segment 31 on the channel beam 13 (Fig. 1). The front end of each yoke has a perforated vertical bracket 32 adapted to be connected by pivoted links 33, 34 and 35 to a plurality of draft springs 36 anchored at their front ends to the front cross bar or pipe 14. The springs will yield when the digger units or the plow shares strike obstructions and prevent them from breaking.

The links and connections to the front ends of the yokes are such as to hold the units adjusted to the proper height so that further adjustments can be made by the levers 30 while the machine is working. In this example, the front ends of the yokes may be raised or lowered manually by levers 37 pivoted on arms or brackets 38 carrying notched or locking segments 39. The segments are preferably secured to the opposite ends of the rear cross bar or pipe 14 (Fig. 1) and the levers are adjustably connected by arms 40 to the links 34. Thus, the levers 37 may be used for making initial adjustments.

In Figs. 3 and 4 there is shown a modified design wherein a pair of digger units 17' are removably mounted on a different style of tractor. In this instance, the rear axle of the tractor is above the axes of the wheels 10' which are mounted on stub shafts driven by gearing in gear cases 50.

The digger units 17' are here shown as being mounted on a drawbar plate or shelf 51 supported by ordinary bars or brackets at the rear end of the tractor. Each unit is pivotally and adjustably supported on a shaft 52 journalled in bearings 53 on the drawbar plate. Power is delivered by a power take-off shaft 54 to shaft 52 which is connected by sprockets and chains to drive the conveyor mechanism of both units (Fig. 4). However, the particular driving connections are relatively unimportant.

The digger units project forwardly under the tractor axle in the same manner as do the diggers in Figs. 1 and 2. They are shown as having the usual draft beams 27' rigidly secured to their forward ends. Draft bars 55 are pivotally secured to the front ends of the beams 27' and removably secured to hooks 56 at the front end of the tractor. Adjusting levers 57 are shown as being connected to the jointed ends of the draft beams 27' and bars 55. The levers have ordinary locking segments 58 on the beams, the arrangement being such that the beams 27' may be raised or lowered by shifting the levers (Fig. 3).

From the foregoing description, it will be seen that the improved underslung diggers may be quickly mounted on and removed from ordinary tractors. By suspending the units below the tractor, in the manner shown, no separate supporting wheels for the units are required, thereby eliminating expense. Further, the adjusting mechanism and driving connections for the units are greatly simplified. Moreover, such units can be made at a much lower cost than the usual trailing units. Also, they do not require wide head lands on which to turn around at the ends of rows.

Obviously, the present invention is not restricted to the particular embodiments thereof herein shown and described. Moreover, it is not indispensable that all the features of the invention be used conjointly, since they may be employed advantageously in various combinations and sub-combinations.

What I claim is:—

1. In combination with a tractor, an underslung potato harvester unit comprising a conveying mechanism and digging means pivotally suspended at the rear end of the tractor; power take-off connections for driving the conveying mechanism of the unit; means resiliently connecting the unit to the forward end of the tractor; and a manually operable lever connected to vary the depth of penetration of the unit.

2. In combination with a tractor adapted to straddle two rows of potatoes, a pair of underslung digger units suspended from the tractor; each unit comprising digging means and conveying mechanism and extending beneath the tractor between the rear wheels with the digging means forward of said wheels; and draft beams on the units adjustably and yieldably connected with respect to the forward end of the tractor.

3. In combination with a tractor, a removable frame mounted on the tractor and projecting beyond the rear end thereof, a superstructure on the frame; a potato digging unit comprising digging means and conveying mechanism suspended from the superstructure and projecting forwardly under the tractor frame below the rear axle, with the digging means forward of the rear wheels; and a draft beam on the digging unit resiliently connected to the forward end of the tractor.

4. In combination with a tractor, a removable frame mounted on the tractor and projecting beyond the rear end thereof; a superstructure on the frame; a potato digging unit comprising digging means and conveying mechanism suspended from the superstructure and projecting forwardly under the tractor frame below the rear axle, with the forward end of the digging means well forward of the rear wheels; power delivering means on the superstructure connected to drive the conveying mechanism of the digging unit from the power unit of the tractor; and a draft beam adjustably and yieldably connected to the forward end of the tractor.

5. In combination with a tractor, a removable frame mounted on the tractor and projecting beyond the rear end thereof; a superstructure on the frame; a potato digging unit with conveyor mechanism suspended from the superstructure and projecting forwardly under the tractor frame below the rear axle; power delivering means on the superstructure connected to drive the conveyor mechanism of the digging unit; a draft beam adjustably and yieldably connected to the forward end of the tractor; and hand levers connected to said unit to control the depth of penetration.

6. In combination with a tractor adapted to straddle two rows of potatoes, a pair of channel beams removably secured to the tractor and projecting beyond the rear end thereof; a superstructure on the projecting ends of said beams; depending brackets secured to the superstructure; a pair of underslung digger units pivotally mounted on said depending brackets and extending forwardly beneath the rear axle of the tractor; adjustable draft devices at the forward ends of the units; draft springs connecting the draft devices to the forward portion of the tractor; and manual means connected to said draft devices to control the respective units.

7. In combination with a tractor adapted to straddle two rows of potatoes, a pair of channel beams removably secured to the tractor and projecting beyond the rear end thereof; a superstructure on the projecting ends of said beams; depending brackets secured to the superstructure; a pair of underslung digger units with conveyor mechanism pivotally mounted on said depending brackets and extending forwardly beneath the rear axle of the tractor; a jack-shaft on the superstructure connected to drive the conveyor mechanism of the diggers; and yieldable draft connections between said units and the forward portion of the tractor.

8. In combination with a tractor adapted to straddle two rows of potatoes, a pair of channel beams removably secured to the tractor and projecting beyond the rear end thereof; a superstructure on the projecting ends of said beams; depending brackets secured to the superstructure; a pair of underslung digger units with conveyor mechanism pivotally mounted on said depending brackets and extending forwardly beneath the rear axle of the tractor; a jack-shaft on the superstructure connected to drive the conveyor mechanism of the diggers; draft bars on the forward ends of the units; draft yokes pivotally connected to the draft bars; links adjustably connected to the forward ends of the draft yokes; draft springs between the links and the forward portion of the tractor; and a pair of hand levers connected to each draft yoke to control the depth of penetration of the units.

ELMO W. JOHNSON.